United States Patent
Amidi et al.

(10) Patent No.: US 10,140,033 B2
(45) Date of Patent: Nov. 27, 2018

(54) APPARATUS, SYSTEM, AND METHOD FOR SEARCHING COMPRESSED DATA

(71) Applicant: XITORE, INC., Mission Viejo, CA (US)

(72) Inventors: Mike Hossein Amidi, Lake Forest, CA (US); Ali Ghiasi, Cupertino, CA (US)

(73) Assignee: XITORE, INC., Mission Viejo, CA (US)

( * ) Notice: Subject to any disclaimer, the term of this patent is extended or adjusted under 35 U.S.C. 154(b) by 0 days.

(21) Appl. No.: 15/183,662

(22) Filed: Jun. 15, 2016

(65) Prior Publication Data

US 2016/0364154 A1    Dec. 15, 2016

Related U.S. Application Data

(60) Provisional application No. 62/180,014, filed on Jun. 15, 2015.

(51) Int. Cl.
*G06F 17/30* (2006.01)
*G06F 3/06* (2006.01)

(52) U.S. Cl.
CPC .......... *G06F 3/0613* (2013.01); *G06F 3/0659* (2013.01); *G06F 3/0679* (2013.01); *G06F 17/30389* (2013.01)

(58) Field of Classification Search
CPC .... G06F 12/00–12/16; G06F 17/30–17/30997
See application file for complete search history.

(56) References Cited

U.S. PATENT DOCUMENTS

| | | | | |
|---|---|---|---|---|
| 5,293,379 A | * | 3/1994 | Carr | H03M 7/30 341/65 |
| 5,737,733 A | * | 4/1998 | Eller | G06F 17/30657 707/708 |
| 9,354,872 B2 | | 5/2016 | Amidi et al. | |
| 2003/0141993 A1 | * | 7/2003 | Baldwin | G06F 17/30985 341/50 |
| 2010/0110915 A1 | * | 5/2010 | Mortensen | H04L 63/1416 370/252 |
| 2011/0202725 A1 | * | 8/2011 | Rose | G06F 9/30018 711/118 |
| 2013/0042066 A1 | * | 2/2013 | Price | G06F 12/0866 711/119 |
| 2014/0136762 A1 | * | 5/2014 | Li | G06F 12/0246 711/103 |
| 2015/0278981 A1 | * | 10/2015 | Akenine-Moller | G06T 1/20 345/522 |

\* cited by examiner

*Primary Examiner* — Nicholas J Simonetti
(74) *Attorney, Agent, or Firm* — Fish IP Law, LLP

(57) ABSTRACT

A system, method and apparatus to provide searching capabilities of a given queue to all of requested search patterns in a non-volatile storage unit with compressed data without decompression thereof. In one embodiment the invention provides system, method and apparatus to execute one or more queued search request of one or more search pattern for one or more non-volatile storage units without decompression of non-volatile storage units compressed data in sequence or in parallel, in order or out of order from the queue. In another embodiment the system, method, and apparatus utilizes a software storage device driver scheduler to distribute the search queues to one or more non-volatile storage units in series or in parallel, in order or out of order, in standard or virtualized operating system capable environments.

20 Claims, 4 Drawing Sheets

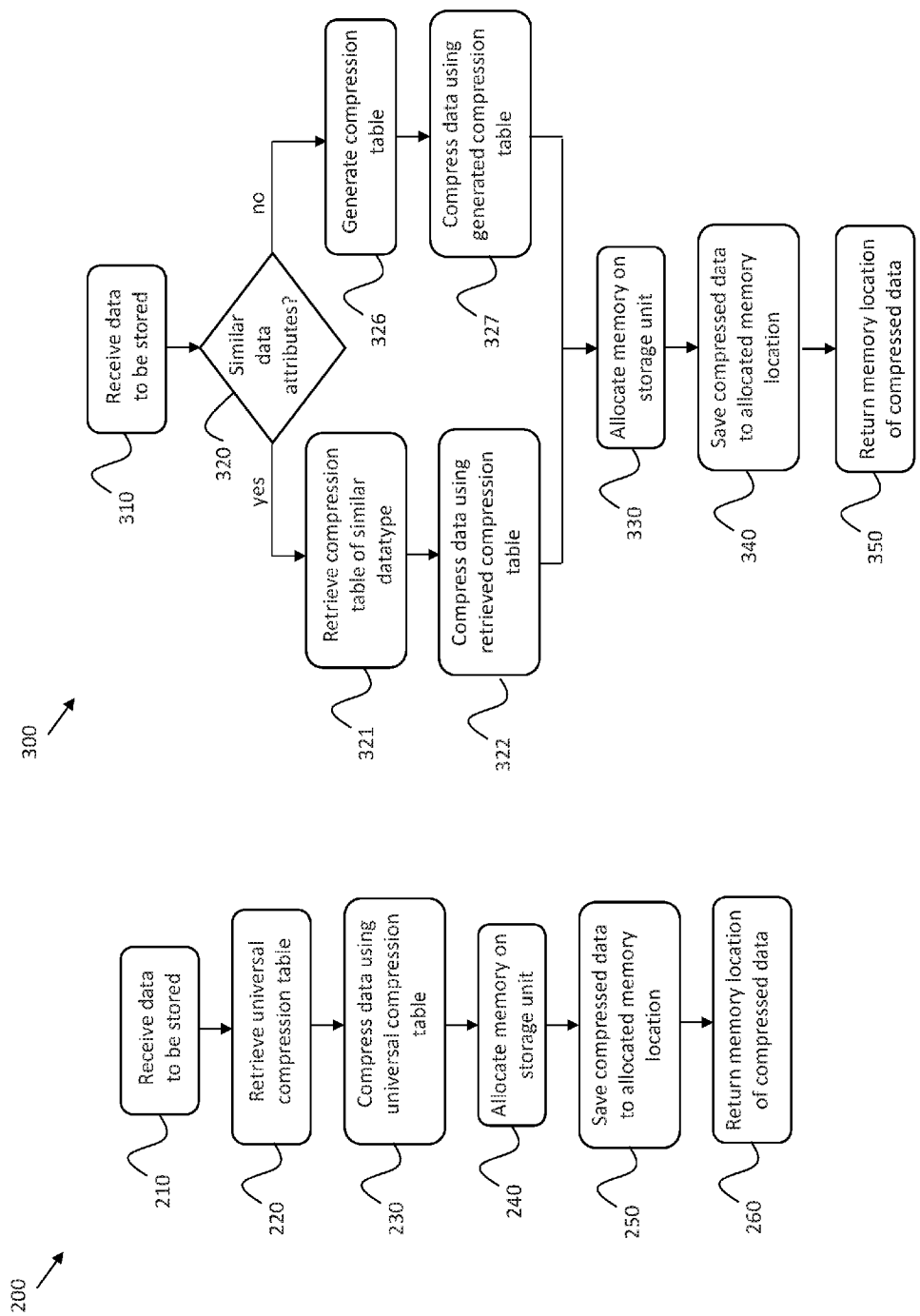

| Table 1 | |
|---|---|
| * | this |
| & | is |
| % | an |
| $ | compressed |
| ^ | text |
| { | data |

520

| Table 2 | |
|---|---|
| # | this |
| ( | is |
| ! | an |
| & | compressed |
| * | text |
| @ | data |

530 uncompressed data = "this is an uncompressed text of data, and this text will get compressed by an algorithm."
230 byte

510 compressed data 1 = "* & % un$ ^ of {, { $ and * ^ will get $ by %  algorithm"
75 byte

522 compressed data 2 = "# ( ! un& * of @, @ & and # * will get & by ! algorithm"
75 byte

APPARATUS, SYSTEM, AND METHOD FOR SEARCHING COMPRESSED DATA

This application claims the benefit of priority to U.S. provisional application 62/180,014 filed on Jun. 15, 2015. This and all other extrinsic references referenced herein are incorporated by reference in their entirety.

FIELD OF THE INVENTION

The field of the invention is access systems for memory devices

BACKGROUND

The background description includes information that may be useful in understanding the present invention. It is not an admission that any of the information provided herein is prior art or relevant to the presently claimed invention, or that any publication specifically or implicitly referenced is prior art.

All publications herein are incorporated by reference to the same extent as if each individual publication or patent application were specifically and individually indicated to be incorporated by reference. Where a definition or use of a term in an incorporated reference is inconsistent or contrary to the definition of that term provided herein, the definition of that term provided herein applies and the definition of that term in the reference does not apply.

Computer systems utilize storage to store and retrieve the data. The main objective of storing and retrieving data into storage is for the computer system to access the data, or to allow other computer systems to access the same data.

Due to the exponential growth in digital storage, today's computer systems use large storage with capacities as large as several terabytes (TB) or 1e+12 Bytes. Even as capacity grows, the need for such capacity frequently outpaces the size of the storage systems. This constant growth requires both consumer and enterprise users to compress and store the required data into storage systems. Many known compression algorithms exist to reduce the redundancy of original data. Compression allows computer system to save space, power, and cost.

In order for a computer system to search for a given pattern within compressed storage, the computer system must first copy some of the compressed data into a volatile memory device, such as Dynamic Random Access Memory (DRAM) units. The computer system then needs to decompress the compressed data within the DRAM to rebuild the original data. Lastly, the computer system looks for the given pattern within the decompressed data. The computer system needs to repeat this process iteratively until all of the compressed data has been searched.

The time it takes to search for a given pattern can be sizeable. Thus, there remains a need for a system and method that improves the search time of compressed data.

SUMMARY OF THE INVENTION

The following description includes information that may be useful in understanding the present invention. It is not an admission that any of the information provided herein is prior art or relevant to the presently claimed invention, or that any publication specifically or implicitly referenced is prior art.

The inventive subject matter provides apparatus, systems, and methods to rapidly search through compressed data without needing to decompress the data.

The system is preferably embodied as a non-volatile storage unit, such as the computer-readable medium disclosed in co-owned application U.S. Pat. No. 9,354,872, which is incorporated herein by reference. The storage unit preferably comprises a non-volatile, non-transitory computer-readable medium (i.e. memory array) upon which compressed data is stored, such as a NAND flash, phase changed memory (PCM), magneto resistive memory (MRAM), or any other non-volatile storage drive.

The storage unit is preferably configured to have a host interface unit that allows it to be operatively coupled to a host system memory controller. For example the storage unit could have an IDE connector, a PATA connector, a SATA connector, a SAS connector, or a PCIe connector. The storage unit is preferably also packaged with a device driver that is programmed to be installed on an operating system, which, when instantiated on a memory, such as a volatile RAM memory (e.g. DRAM, SDRAM, RDRAM), allows a computer processor in the computer system to transmit or receive commands, status, or data with the storage unit. The device driver could be provided through any suitable means to the computer system, such as an optical disc, a USB flash drive, or an online Internet website. The device driver is typically then installed on an operating system of the computer system to be instantiated when the operating system needs access to the storage unit.

The storage unit also preferably comprises a local controller that is configured to retrieve, fetch, analyze, process, store and/or restore data on the computer-readable medium. The controller preferably has a processor of its own and firmware that is programmed to perform the data transaction functions set forth below, but could be configured to perform data transaction functions using specialized hardware, such as logic gates and transistors. The controller receives signals, such as search commands for a set of uncompressed search data, from the computer processor via the device driver, and returns memory locations (logical or physical) to the computer processor in response. The computer processor typically communicates with the storage unit via a host memory controller, such as an IDE connector, a PATA connector, a SATA connector, or a PCIe connector on a motherboard or a PCI card operationally coupled to a PCI slot on a motherboard. In some embodiments, the computer processor may even communicate with the storage unit via a USB or Thunderbolt connector, although such ports are typically too slow for best mode storage units.

The local controller comprises one or more compression engines that are configured to reproducibly compress data to the storage unit. As used herein, to "compress" data means to alter the data such that the data takes up less space on the storage unit than in its uncompressed state. Any suitable compression algorithm could be used, for example LZRW3 lossless compression algorithms or other compression algorithms based on Lempel-Ziv compression methods. As used herein, to "reproducibly compress" data means to compress data in a manner that creates the same compressed data every time the same uncompressed data is submitted to the compression engine. Any suitable means for reproducibly compressing data could be used, for example using a universal compression table to compress the data, or by generating a compression table, saving the compression table to a memory, and then using the same compression table in a subsequent compression step. The compression engine could be embodied by firmware installed on a memory of the local controller, or could be embodied by an internal hardware block specifically configured to compress data in accordance with a compression algorithm. As used herein, an "internal hardware block" comprises logic gates and transistors specifically designed to perform a function, such as compression or comparison. Internal hardware blocks are inherently non-programmable, as they have no inherent non-volatile memory upon which computer code can be saved.

When the local controller receives commands to store uncompressed data on the storage unit, the local controller is configured to compress the uncompressed data to compressed data before storing the compressed data on the storage unit. This ensures that a minimum amount of space is used by the local controller when saving data to the computer-readable medium. Preferably, all sets of submitted uncompressed data are first compressed before saving the uncompressed data to the computer-readable medium.

When the local controller receives commands to search for uncompressed search data on the storage unit, the local controller first compresses the uncompressed search data to a set of compressed search key data before comparing the compressed search key data against the compressed saved data on the computer-readable medium. Since the compression engine is configured to reproducibly compress the same set of uncompressed data in the same manner, the attributes of the compressed search key data will match the attributes of the compressed data saved on the computer-readable medium. In some embodiments, the compression engine uses a universal compression table to compress the uncompressed search data, while in other embodiments the compression engine is configured to use a compression table that is associated with the area of the computer-readable medium. In such embodiments, the compression engine first identifies the area to be searched, identifies the compression table that is associated with that area of to be searched, and then uses the identified compression table to reproducibly compress the set of uncompressed search data. When the local controller searches other portions of the computer-readable medium, the local controller will need to use compression tables associated with those other portions.

The local controller also comprises one or more internal search engines that then compare the compressed search key data against compressed data saved on the computer-readable medium. When the search engine finds a match, the search engine will log the match somehow, for example by returning a Boolean true, by returning a memory address (physical or logical), by returning a variable identifier, or by saving a memory address (physical or logical) to a match pattern list of memory addresses.

The local controller also comprises one or more internal location engines that are configured to transmit the search results to back to the calling process. The search results are typically transmitted via the host system memory controller using protocols in accordance with the instantiated device driver. In preferred embodiments, the internal location engine transmits a match pattern list of memory address that matched with the compressed search key data. In other embodiments, the internal location engine could be configured to save the search results directly to a memory accessible by the processor of the computer system, such as a volatile RAM or a non-volatile drive.

The local controller could be configured with parallel internal compression engines, internal search engines and/or parallel internal location engines which allow the local controller to run multiple searches in parallel with one another, and in any order. In some embodiments, the local controller could be configured to analyze a set of search requests and optimize in series and/or in parallel across the internal engines to increase throughput.

Various objects, features, aspects and advantages of the inventive subject matter will become more apparent from the following detailed description of preferred embodiments, along with the accompanying drawing figures in which like numerals represent like components.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

BRIEF DESCRIPTION OF THE DRAWING

FIG. 2 is a flowchart of an exemplary method to store data in the storage unit.

FIG. 3 is another flowchart of an exemplary method to store data in the storage unit.

FIG. 5 shows examples of compressed and uncompressed data using various compression tables.

DETAILED DESCRIPTION

Figure 1:
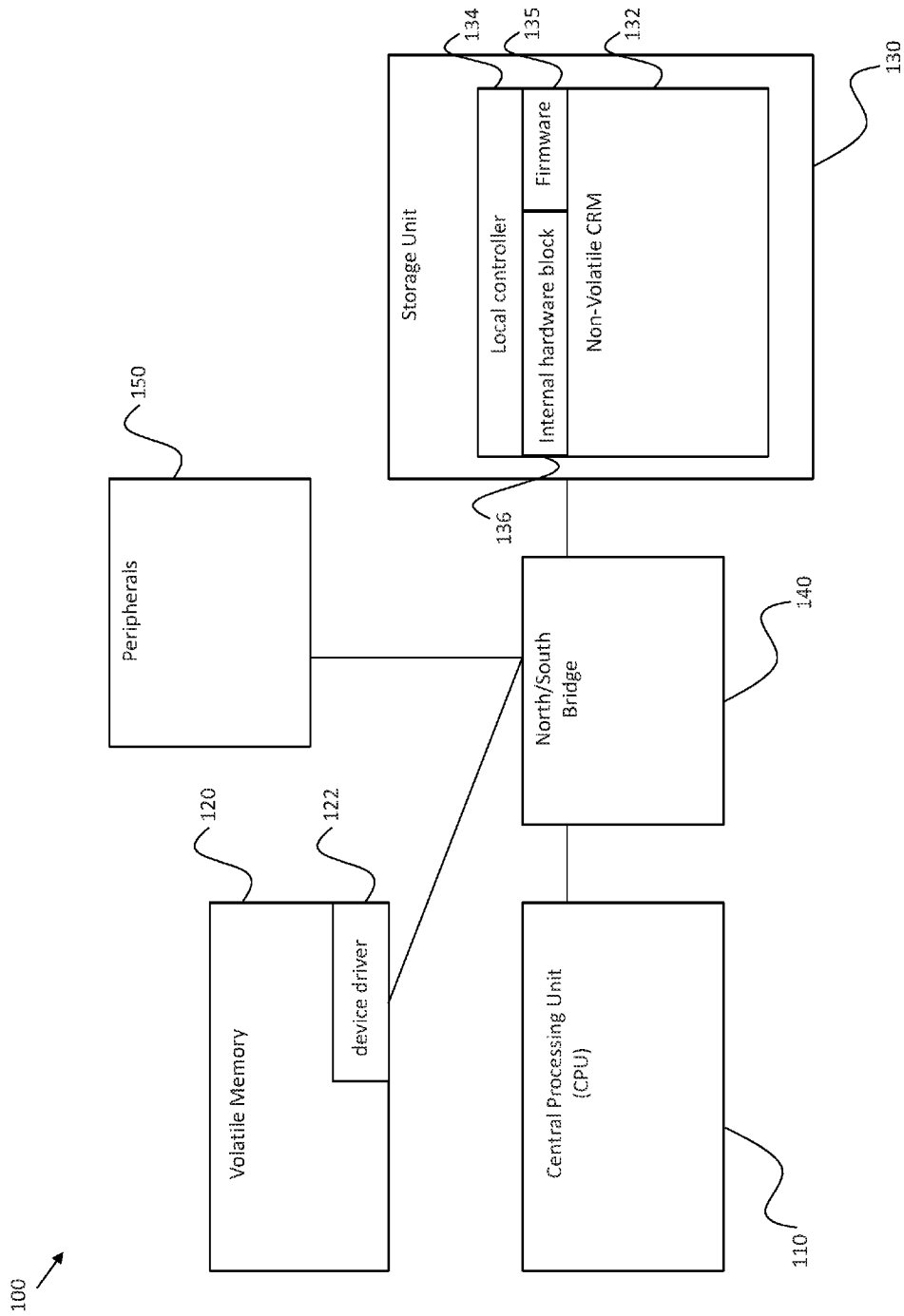
FIG. 1 is a schematic of a storage unit coupled with a host computer system.

As used in the description herein and throughout the claims that follow, the meaning of "a," "an," and "the" includes plural reference unless the context clearly dictates otherwise. Also, as used in the description herein, the meaning of "in" includes "in" and "on" unless the context clearly dictates otherwise.

As used herein, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously. As used herein, the term "operatively coupled to" refers to electronic components that are coupled with one another such that an electronic communication path exists between one electronic hardware component and another electronic hardware component.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all Markush groups used in the appended claims.

It should be noted that any language directed to a computer system should be read to include any suitable combination of computing devices, including servers, interfaces, systems, databases, agents, peers, engines, controllers, or other types of computing devices operating individually or collectively. A "host" computer system is a functional computer system having a processor and motherboard to which a storage unit could be operatively coupled to in order to serve as a computer-readable medium for the computer system. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. Computer software that is "programmed" with instructions is developed, compiled, and saved to a computer-readable non-transitory medium specifically to accomplish the tasks and functions set forth by the disclosure when executed by a computer processor.

The inventive subject matter provides apparatus, systems, and methods to rapidly search through compressed data without needing to decompress the data.

In FIG. 1, a computer system 100 has a CPU 110, a volatile memory 120, a storage unit 130, a north/south bridge 140, and peripherals 150. CPU 110, volatile memory 120, north/south bridge 140, and peripherals 150 represent a host computer system which storage unit 130 is operatively coupled to via north/south bridge 140. North/south bridge 140 represents the hardware bus which couples CPU 110 to peripherals 150, volatile memory 120, and storage unit 130, for example a computer motherboard, male/female interface ports, serial and parallel cables, and PCI cards. As used herein, a "north bridge" is a chip in the chipset of the motherboard that connects high speed buses, such as an FSB (front-side bus), a main memory bus, and/or a PCIe bus. As used herein a "south bridge" is another chip in the chipset of the motherboard that connects slower busses, such as a PCI bus, a USB (universal serial bus), and a SATA bus. The north bridge and the south bridge could be operationally coupled to one another using a DMI (direct media interface) bus Storage unit 130 is preferably directly operatively coupled to a host system memory controller, such as a female SATA connector on a motherboard, so as to minimize transmission lag between CPU 110 and storage unit 130. Peripherals 150 represent additional hardware peripherals used by computer system 100 which do not necessarily have a direct bearing upon storage and search communication transactions between CPU 110 and storage unit 130, for example display screens, keyboards, touch screens, speakers, music players, magnetic hard drives, NAS attached storage, and wired/wireless connections.

In order to communicate with the storage unit, a device driver is installed on the local operating system, which could be saved on storage unit 130, but is preferably saved on a peripheral hard drive as one of peripherals 150. As used herein a "device driver" is a piece of software that runs on the host side part of the computer system, and directly communicates via a kernel of the operating system of the host computer system to existing hardware, such as peripherals 150 or storage unit 130. Any suitable operating system could be used, such as Windows™, OS X™, Redhat™, but the operating system is preferably a RTOS (real time operating system) such as Green Hills Software INTEGRITY™, Wind River VxWorks™, QNX Neutrino™ or FreeRTOS™. When the operating system needs to access storage unit 130, the operating system will typically instantiate the device driver on volatile memory 120, which CPU 110 will use to call functions that transmit commands to storage unit 130, such as commands to store data, retrieve data, and search for data (e.g. grep or find functions).

Storage unit 130 has a local controller 134, which receives commands from device driver 122 and executes the commands appropriately. Local controller 134 has one or more dedicated local processors and computer-readable memory that is used to execute the commands received from CPU 110. Local controller 134 could have firmware 135 installed on a programmable chip or memory of local controller 134, and/or could have dedicated internal hardware blocks 136 that are especially configured to perform some of the functions of local controller 134. For example, since compression/decompression is a typically time-consuming task, aspects of a compression/decompression algorithm could be hard-coded in one or more internal hardware blocks 136 used by local controller 134. The memory used by local controller 134 could be a separate computer-readable memory from non-volatile CRM (computer-readable medium) 132, but preferably local controller 134 uses a dedicated block of memory from non-volatile CRM to store firmware, compression tables, hash tables, and other headers that are used by firmware 135 to access and manipulate data on non-volatile CRM 132. As used herein, "firmware" is a piece of software that runs inside embedded processors or micro controllers, and typically uses round robin and/or scheduler technology to function. Preferably, the firmware used by local controller 134 uses an RTOS system.

Non-volatile CRM 132 preferably comprises a solid-state memory upon which data is saved. Non-volatile CRM 132 has physical memory locations which could be directly provided to CPU 110 via device driver 122, but preferably is translated to virtual memory locations via a hash table.

FIG. 2 shows an exemplary method to store compressed data on a storage unit, such as storage unit 130. In this method, the system uses a universal compression table which is used to compress all uncompressed data that is submitted to the storage unit. In step 210, the local controller receives data to be stored from a CPU. In step 220, the local controller then retrieves a universal compression table from memory, which is used to compress the data to be stored on the storage unit. The local controller uses the universal compression table to compress the data in step 230, and allocates memory on the storage unit which the compressed data will be saved upon in step 240. The local controller the saves the compressed data to the allocated memory location in step 250, and returns a memory address (e.g. a logical memory address, a physical memory address) to the process executing the command to store data on the storage unit in step 260.

FIG. 3 shows another exemplary method to store compressed data on a storage unit, such as storage unit 130. In this method, the system uses several compression tables which are used to compress all uncompressed data that is submitted to the storage unit. The system could use one compression table for alphanumeric string data, another table for images, another table for videos, another compression table for binary data, and another table for hexadecimal data. Any suitable manner to differentiate data types could be used. In step 310 the storage unit receives data to be stored. In step 320 the storage unit examines the uncompressed data to be stored to determine whether the data has similar data attributes to data that has already been stored on the storage unit.

If similar data attributes have been detected, the storage unit then retrieves a compression table associated with data of that similar datatype, and compresses the data using that retrieved compression table in step 322. If similar data attributes have not been detected, the storage unit then generates a new compression table in step 326, and compresses the data using the generated compression table in step 327. However the data is compressed, the storage unit allocates memory on the storage unit which the compressed data will be saved upon in step 330. The local controller the saves the compressed data to the allocated memory location in step 340, and returns either the physical or logical memory address to the process executing the command to store data on the storage unit in step 350.

Figure 4:
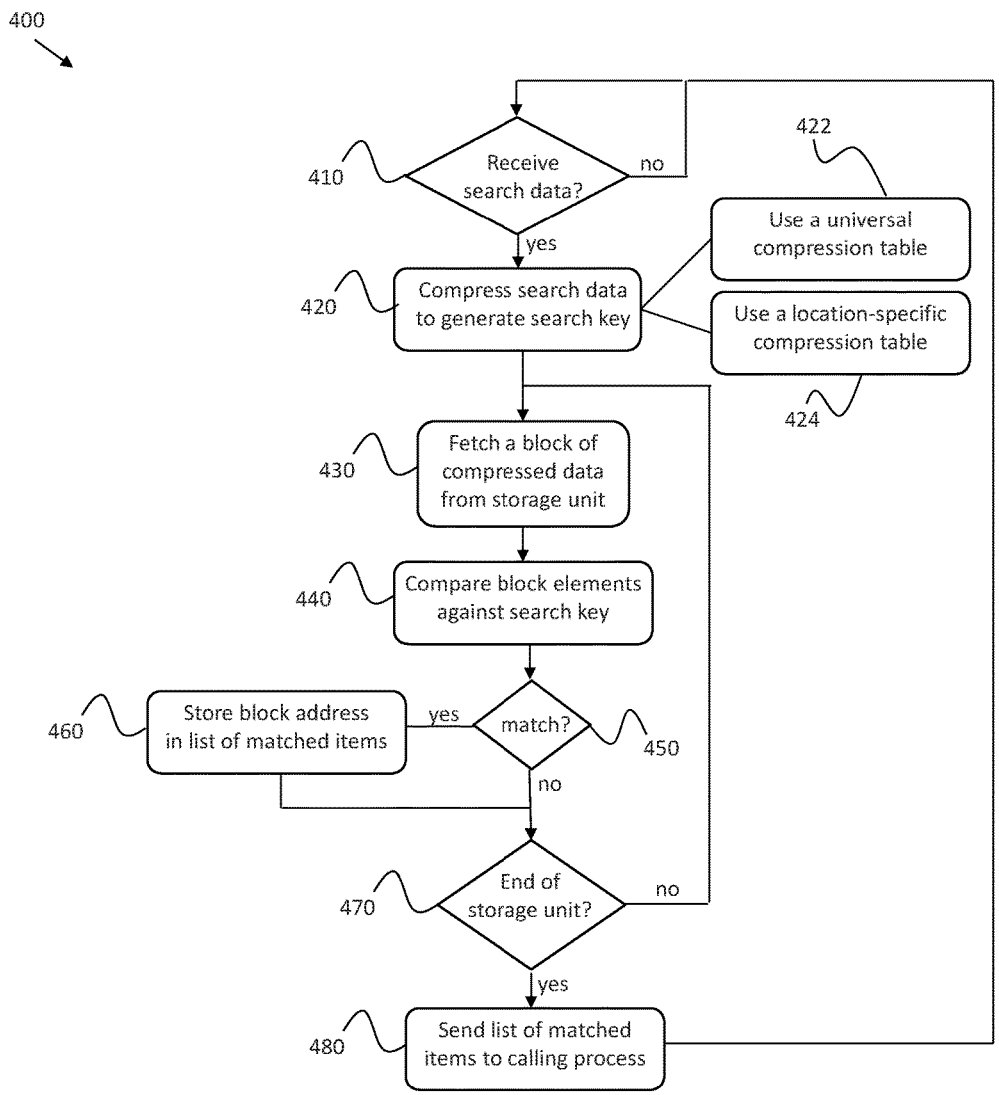
FIG. 4 is a flowchart of an exemplary method to search for data in the storage unit.

FIG. 4 shows an exemplary method to search for data that has been compressed and saved on a storage unit, such as storage unit 130. In step 410, the storage unit waits for a command, such as a grep or find command, to search for data on the storage device. The search data that is submitted is referred to herein as "uncompressed" data. When a command is received, the storage unit proceeds to step 420, whereupon the internal compression engine compresses the search data to generate the search key. Depending upon how the internal compression engine compressed the data, the internal compression engine could use a universal compression table in step 422 to compress the search data, or could use a location-specific compression table in step 424. Compressing the uncompressed search data results in generating a compressed search key, which could then be used by the internal search engine to determine whether or not the search data is saved on the storage unit.

In step 430 the internal search engine fetches a block of compressed data from the storage unit to search, and compares the block elements against the search key in step 440. If the internal search engine finds a match in step 450, the internal search engine stores the address of the block in a list of matched items in step 460. Whether or not a match is found, the storage unit determines whether it is at the end of the storage unit in step 470. If there are still additional data blocks to be searched, the storage unit then increments to the next storage block and reiterates the process at step 430 until all of the storage blocks have been searched, and a full list of matched items has been created. When the end of the storage unit is reached, an internal location engine of the storage unit will return a list of matched items to the calling process in step 480. The list of matched items could comprise logical or physical memory addresses.

FIG. 5 shows an example of compressed and uncompressed data using alternative compression tables. As shown, uncompressed data 510 shows an alphanumeric string of text which takes 230 bytes of data. The uncompressed data 510 could be compressed using compression table 520 (labeled Table 1) or compression table 530 (labeled Table 2) to create a smaller, 75 byte block of alphanumeric text, shown here as alphanumeric text 522 and 532, respectively. As shown, the same uncompressed data could be compressed using two different compression tables to generate smaller compressed data of the same size, but having completely different search keys. This shows why it is important when using certain compression algorithms to ensure that the same compression table is used to both store and to search for compressed data in an embodiment of an inventive storage unit.

It should be apparent to those skilled in the art that many more modifications besides those already described are possible without departing from the inventive concepts herein. The inventive subject matter, therefore, is not to be restricted except in the scope of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A storage system for rapidly searching compressed data, comprising:
   a non-volatile, non-transitory computer-readable medium; and
   a controller that receives a store command for a set of uncompressed storage data from a host computer processor via a host system memory controller and a search command for a set of uncompressed search data from the host computer processor via a north/south bridge, having:
   an internal compression engine that reproducibly:
   (a) selects a compression table from a group of compression tables as a function of a data type of the set of uncompressed storage data, and
   (b) compresses the set of uncompressed storage data using the compression table to generate compressed storage data that is stored on the computer-readable medium and that reproducibly compresses the set of uncompressed search data to generate a set of compressed search key data, and
   (c) stores the compressed storage data on a storage unit;
   an internal search engine that matches the set of compressed search key data against the compressed storage data stored on the storage unit to return a set of memory location addresses in the compressed storage data that directly match the set of compressed search key data; and
   an internal location engine that transmits the set of memory location addresses to the host computer processor in response to the search command,
   wherein the north/south bridge is coupled to the host computer processor and the non-volatile, non-transitory computer-readable medium.

2. The storage system of claim 1, wherein the computer-readable medium comprises a solid state hard drive.

3. The storage system of claim 1, wherein the controller receives the search command from the host computer processor via a storage device driver instantiated on a volatile computer-readable medium operatively coupled to the host computer processor.

4. The storage system of claim 1, wherein the internal compression engine reproducibly compresses the set of uncompressed storage data and the uncompressed search data using an internal compression algorithm not received with the uncompressed search data or the compressed storage data.

5. The storage system of claim 4, wherein the internal compression algorithm is embodied by an internal hardware block configured to compress data in accordance with the internal compression algorithm.

6. The storage system of claim 1, wherein the internal compression engine further:
   (a) examines the uncompressed storage data to determine whether the uncompressed storage data has similar data attributes to data already stored on the storage unit and
   (b) generates the compression table as a new compression table when the set of uncompressed data is not similar to data that has already been stored on the storage unit.

7. The storage system of claim 1, wherein the internal compression engine uses a universal compression table to reproducibly compress the set of uncompressed search data.

8. The storage system of claim 1, wherein the internal compression engine is programmed to:
   select a section of the computer-readable medium to search;
   identify a compression table associated with the selected section; and
   use the identified compression table to reproducibly compress the set of uncompressed search data.

9. The storage system of claim 1, wherein the internal location engine is programmed to transmit the set of memory location addresses as logical addresses of the computer-readable medium.

10. The storage system of claim 1, wherein the internal location engine is programmed to transmit the set of memory location addresses as physical address locations of the computer-readable medium.

11. The storage system of claim 1, wherein the host system memory controller composes a computer motherboard.

12. A method for rapidly searching stored data on a non-volatile, non-transitory computer-readable medium, comprising:
   receiving a command from a storage device driver via a host system memory controller to save a set of uncompressed storage data to the computer-readable medium, wherein the host system memory controller receives the command from a host computer processor via a north/south bridge that is coupled to the host computer processor and the non-volatile, non-transitory computer-readable medium;
   reproducibly select a compression table from a group of compression tables as a function of a data type of the set of uncompressed storage data;
   reproducibly compressing the set of uncompressed storage data using the compression table to generate a set of compressed storage data;
   saving the compressed storage data on the computer-readable medium;
   receiving a command from a storage device driver via a host system memory controller to locate a set of uncompressed search data;
   reproducibly compressing the set of uncompressed search data to generate a set of compressed search key data;
   comparing the set of compressed search key data against the compressed storage data to generate a set of memory location addresses in the computer-readable medium that directly match the set of compressed search key data; and
   providing the set of memory location addresses in response to the command from the storage device driver.

13. The method of claim 12, wherein the steps of reproducibly compressing the set of uncompressed storage data and reproducibly compressing the set of uncompressed search data comprises using an internal compression algorithm not received with the uncompressed storage data or the compressed search data.

14. The method of claim 13, wherein the internal compression algorithm is embodied by an internal hardware block configured to compress data in accordance with the internal compression algorithm.

15. The method of claim 12, wherein the step of reproducibly compressing the received uncompressed storage data comprises utilizing a universal compression table, and wherein the step of reproducibly compressing the set of uncompressed search data comprises utilizing the universal compression table.

16. The method of claim 12, wherein the step of reproducibly compressing the received uncompressed data comprises:
   generating a compression table for compressing the received uncompressed data and saving the generated compression table to the computer-readable medium.

17. The method of claim 12, further comprising instantiating the storage device driver on a volatile memory operatively coupled to a computer processor.

18. The method of claim 12, further comprising:
   examining the uncompressed storage data to determine whether the uncompressed storage data has similar data attributes to data already stored on the computer-readable medium and
   generating the compression table as a new compression table when the set of uncompressed data is not similar to data that has already been stored on the computer-readable medium.

19. The method of claim 12, wherein the step of providing the set of memory location addresses comprises transmitting the set of memory location addresses as physical addresses of the computer-readable medium.

20. The method of claim 12, wherein the step of providing the set of memory location addresses comprises transmitting the set of memory location addresses as logical addresses of the computer-readable medium.

* * * * *